Sept. 17, 1968     M. ALLEN ET AL     3,402,120
ELECTROHYDRAULIC PURIFICATION APPARATUS
Filed June 1, 1964                              3 Sheets-Sheet 1

Inventors:
Merton Allen,
Edward C. Schrom,
by Paul A. Frank
Their Attorney.

Inventors:
Merton Allen,
Edward C. Schrom,
by Paul A. Frank
Their Attorney.

United States Patent Office 3,402,120
Patented Sept. 17, 1968

3,402,120
ELECTROHYDRAULIC PURIFICATION
APPARATUS
Merton Allen and Edward C. Schrom, Schenectady, N.Y., assignors to General Electric Company, a corporation of New York
Filed June 1, 1964, Ser. No. 371,639
4 Claims. (Cl. 204—323)

ABSTRACT OF THE DISCLOSURE

Apparatus is disclosed utilizing electrohydraulic shocks for the purification of contaminated water and other substantially non-compressible liquids and for the sterilization of objects such as surgical instruments. This is accomplished by the generation of an arc discharge through a portion of the fluid which produces a shock wave and chemically active species which are effective in killing organisms in the fluid.

Our invention relates to an electrohydraulic apparatus for purifying a fluid medium, and in particular, to an apparatus wherein pulses of relatively low electric energy are generated and thence released in a suitable unpurified, relatively noncompressible fluid dielectric medium resulting in an arc discharge, chemically active species and a sudden pressure or shock wave therein of sufficient intensity to purify the fluid.

A recently developed concept, conveniently named "electrohydraulics" is known to have the ability of killing many strains of microorganisms which are known to cause pollution of surface and sub-surface water sources. The known application, however, utilizes a high voltage, high energy circuit and is relatively inefficient in that a high energy level is required to kill a particular number of microorganisms in a given volume of fluid. The electrohydraulic concept comprises a controlled release of a stored electric energy into a relatively noncompressible fluid dielectric medium which comprises the material to be purified. The release of the stored energy in the fluid medium generates a controlled steep pressure or shock wave therein of sufficient intensity and a multitude of chemically active species to accomplish the purification process. The intensity of the pressure or shock wave which accomplishes the useful work in the fluid medium may be controlled by controlling the magnitude of the stored electric energy or its manner of transmission into the fluid medium. Previously known electrohydraulic systems controlled the manner or rate of discharge of the stored electric energy into the fluid medium by controlling the ionization in air or gas gap switches which are contained in the discharge path. Such method of electric energy discharge control has the disadvantages of nonprecise timing since the electrodes of the gap switches rapidly become eroded, resultant inconsistent and unreliable operation due to such erosion, high maintenance costs, and possible presence of contaminating materials within the enclosure containing the gap switch. To our knowledge the electrohydraulic concept has not been applied to the purification of any other material than water.

Therefore, one of the principal objects of our invention is to provide an improved electrohydraulic apparatus for preparing purified and potable water from nonpurified water sources in an efficient manner.

Another object of our invention is to provide such apparatus wherein the water is purified in a continuous process.

A further object of our invention is to provide such apparatus wherein the water is purified in a noncontinuous process.

A still further object of our invention is to provide such apparatus for processing food and drug products.

Another object of our invention is to provide such apparatus for the sterilization of solid surfaces placed in a liquid medium.

Briefly stated, and in accordance with our invention, we provide an apparatus which comprises at least one fluid container which may be completely enclosed or provided with at least one inlet fluid passage for supplying an unpurified fluid to the container and an outlet passage for the exit of the fluid upon purification thereof. Within the container is positioned at least one discharge electrode of an electrohydraulic shock generator for generating an arc discharge resulting in the production of chemically active species and a steep pressure or shock wave within the fluid. The electrical circuit of the electrohydraulic generator is provided with control means for determining the sequence and other characteristics of the shock waves produced in the dielectric fluid contained within the first container. The arc discharge is generated when stored electric energy from the generator is discharged into a spark gap formed by the discharge electrode while immersed in the fluid. The apparatus when consisting of only a first fluid container is especially suited for continuous purification of a fluid medium continuously flowing through the container, or for the sterilization of solid surfaces placed in a liquid medium.

A second fluid container, operatively connected to an outlet of the first container, may be employed to obtain a noncontinuous or batch type purification process. The latter apparatus employs suitable electromechanical control means for regulating both the flow of fluid through the apparatus and the time intervals during which the electrohydraulic shock generator is operated. A third fluid container may be added, if desired, to an outlet of the second container, the third container being supplied with a pump device to provide the purified fluid within the third container at a desired pressure level for use in a pressurized distribution system. The fluid to be purified by our apparatus is not limited to water but may be employed in waste treatment systems or in the preparation and processing of fluid materials which are in a liquid or semiliquid state such as drugs, fruit juice drinks, baby food, or for solids placed in a liquid medium.

The features of our invention which we desire to protect herein are pointed out with particularity in the appended claims. The invention itself, however, both as to its orrangization and method of operation, together with further objects and advantages thereof, may best be understood by reference to the following description taken in connection with the accompanying drawings, wherein like parts in each of the several figures are identified by the same reference character, and wherein:

Figure 5:
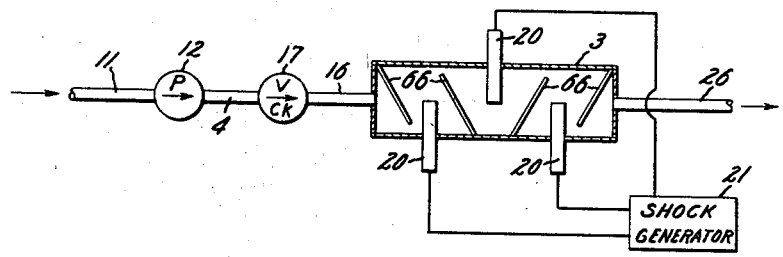
Figure 6:
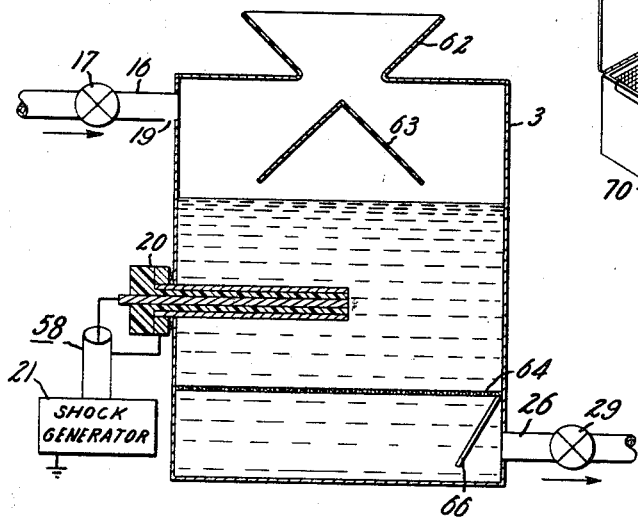
Figure 7:
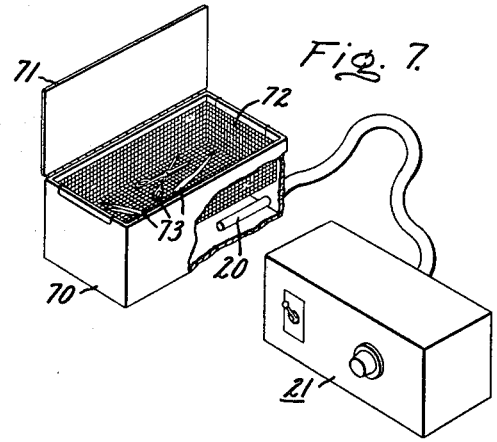

FIGURE 5 is a schematic diagram of a second embodiment of our invention wherein purification is obtained on a continuous basis, FIGURE 6 is a schematic diagram of a third embodiment of our invention which is useful in the preparation and processing of liquid or semiliquid food products or other materials of more than one constituent; and FIGURE 7 is a schematic diagram of a fourth embodiment of our invention which is useful in the sterilization of solid surfaces placed in a liquid media, for instance surgical instruments.

Figure 1:
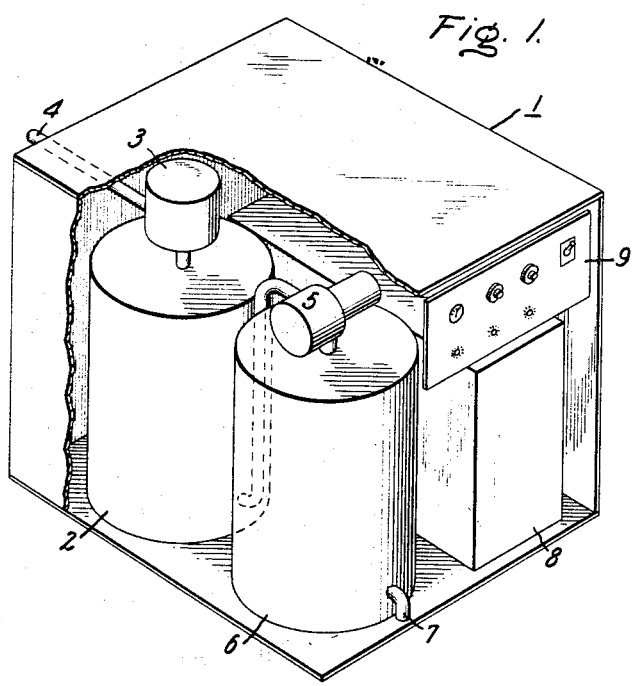
FIGURE 1 is a perspective view, partly in section, of a first embodiment of an electrohydraulic purification apparatus constructed in accordance with our invention.

Referring now to the perspective illustration of FIGURE 1, there is shown an electrohydraulic purification apparatus which is especially adapted for household use in supplying potable water under pressure from an existing nonpurified water supply system. In particular, a cabinet, illustrated as a whole by numeral 1, is employed to contain the electrohydraulic apparatus. Cabinet 1 may be of any desired shape, and for purposes of illustration is indicated as being rectangular. Cabinet 1 may be constructed of any suitable material such as sheet metal. Within cabinet 1 there is positioned on the base thereof, a relatively large storage tank 2 for collecting the water after it has been purified. An electrohydraulic chamber 3 is connected in fluid communication with the top of tank 2 and may be conveniently mounted thereon. Chamber 3 comprises a relatively small tank containing, among other elements, a spark discharge electrode. The electrode upon being immersed in the nonpurified water (or other nonpurified, relatively noncompresible fluid dielectric medium), and energized by a controlled pulse of electric energy, produces a spark discharge which generates chemically active species and a relatively accurately predictable sudden intense pressure wave within the fluid by the known electrohydraulic energy conversion concept to kill selected bacteria and other micoorganisms within the fluid, thereby purifying it. An inlet fluid passage 4 is connected to the non-purified fluid supply system (not shown), passes through a wall of cabinet 1, and is connected to an inlet of electrohydraulic chamber 3. An outlet of collecting and storage tank 2 is connected to a distribution system pump 5 which is mounted on, and in fluid communication with, a distribution system pressure tank 6. Tank 6 is supported by the base of cabinet 1 and an outlet of such tank is connected to a suitable distribution fluid passage means 7 which passes through a wall of cabinet 1 and provides the outlet for our electrohydraulic apparatus. Fluid passage 7 is connected to the purified fluid distribution system (not shown) for utilization thereby. The electrical circuitry necessary for generating the relatively low magnitude electric energy pulses employed, as well as control equipment for controlling the pulse magnitude, duration and sequence of release and conversion of such electric energy within the fluid, and other electromechanical controls for regulating flow of the fluid medium within the apparatus, are contained within a smaller cabinet 8 supported by the base of cabinet 1. A control panel 9 is mounted on an exterior side of a wall of cabinet 1 for indicating various operating characteristics of our electrohydraulic apparatus. Tanks 2, 3 and 6 may be of cylindrical shape, as illustrated, or other suitable configurations, storage tanks 2 and 6 being especially disposed to be of any desired shape.

The electrohydraulic apparatus illustrated in FIGURE 1, thus, has an inlet fluid passage 4 which is connected to a nonpurified fluid supply system, and an outlet fluid passage 7 which supplies the purified fluid, under pressure, for utilization in any desired manner. It can be appreciated that the apparatus may be simplified by omitting pump 5 and tank 6 if the purified fluid does not have to be supplied under pressure.

The fluid to be purified by our apparatus of FIGURE 1 may be an existing water supply system wherein the nonpurified water is obtained from a surface or subsurface water source, the output of a waste treatment plant wherein it is desired to destroy particular microorganisms in the waste, or any other relatively noncompressible fluid dielectric medium which is desired to be purified. Our apparatus is capable of killing very small microscopic organisms such as viruses, microbes, bacteria, bacteriophages, bysogenic bacteria, algae, yeast, fungi, protozoa and spores, as well as larger organisms such as cells, snails, schistosomes, crutacean, pupa, larva and insects in a manner to be heerinafter described in greater detail.

Figure 2:
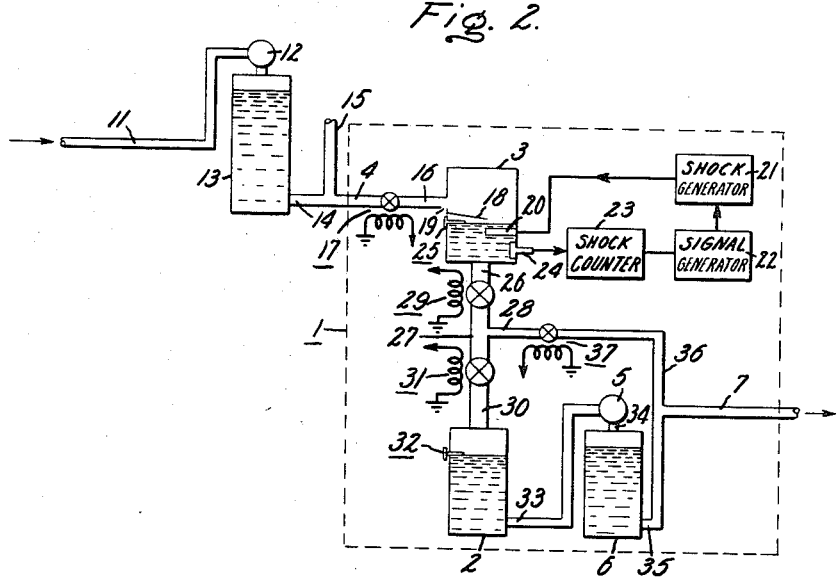
FIGURE 2 is a schematic diagram of the apparatus illustrated in FIGURE 1.

FIGURE 2 of the drawings illustrates, in schematic form, a first embodiment of our electrohydraulic apparatus which is especially adapted to purify fluid on a batch or noncontinuous basis, and to supply the purified fluid on a continuous basis. The apparatus of FIGURE 2 is constructed in accordance with our invention as shown in FIGURE 1. In FIGURE 2, the fluid passage means 11, such as a conduit having a circular cross section for example, is connected at a first end thereof to a fluid supply system (not shown) and connected to a pump 12 of conventional design at a second end thereof. The output of pump 12 exhausts into a storage tank 13 which provides at an outlet 14 thereof the nonpurified fluid medium entering passage 11, but at a particular pressure as determined by pump 12. A nonpurified fluid distribution passage 15 may be connected to outlet passage 14, if desired, for particular applications wherein the nonpurified fluid under pressure may be utilized.

The electrohydraulic apparatus contained within cabinet 1 in FIGURE 1 is illustrated as being contained by the dashed line 1 in FIGURE 2. The inlet 4 to the apparatus is connected to passage 14 at a first end thereof, and, within the cabinet is connected to a first fluid flow regulating device, indicated as a whole by numeral 17, which for purposes of illustration is indicated as a normally closed solenoid type valve wherein electrical energization of the solenoid element thereof operates to allow the flow of fluid through the valve. The outlet of valve 17 is connected to an entrance fluid passage 16 of electrohydraulic chamber 3. A baffle 18 is supported within chamber 3 adjacent the inlet thereof and is employed to prevent the fluid medium within the chamber from being splashed out through air gap 19 during the generation of the intense pressure waves within the fluid. Air gap 19, disposed within the lower portion of passage 16 immediately adjacent the entrance to chamber 3, is a safety feature ensuring that no nonpurified fluid will leak past closed valve 17 and into chamber 3 during the interval in which the fluid, after being purified, is exhausted to storage tank 2. A discharge electrode 20 of the electrohydraulic shock generator 21 is positioned within and supported by a wall of electrohydraulic chamber 3 in a lower portion thereof such that the electrode is completely immersed within the fluid medium contained therein. Electrode 20 preferably comprises a longitudinally extending solid rod of electrically conductive material, a hollow coaxial sheath of electrically conductive material substantially coextensive with the rod in length and having an internal opening larger than the transverse rod dimensions to define an annular space with the rod, and a solid dielectric spacer means occupying the annular space so as to bond the sheath to the rod and form a continuous solid construction for the length of the electrode (see FIGURE 6). The electrode configuration generates a spark between the exposed end of the central rod and surrounding sheath element which is normally grounded, with each pulse of an operatively associated relatively low energy electrical circuit. The pulsed energy electrical circuit is shown in block diagram form as shock generator 21 and is illustrated in greater detail in FIGURE 4 of the drawings. A signal generator circuit 22 comprising a conventional triggering electronic circuit provides a start signal to shock generator 21 for initiating the operation there of. Signal generator 22 also provides a stop signal to the shock generator at the termination of the desired number of shocks generated within electrohydraulic chamber 3 as detected by shock sensor 24 and registered on shock counter 23. A first fluid level control device 25 is positioned within a wall of electrohydraulic chamber 3, disposed intermediate baffle 18 and electrode 20 such that it senses a desired level of fluid therebetween.

The fluid medium contained within electrohydraulic chamber 3, after having been purified or otherwise processed by the desired number of shock waves, as will hereinafter be described in greater detail, exhausts therefrom by means exit fluid passage 26. Exit passage 26 is connected to a junction of fluid passages 27 and 28 by means of a second flow regulating device, exemplified by a normally closed solenoid type fluid valve 29. Passage 27 is connected to an entrance fluid passage 30 of collecting and storage tank 2 by means of a third flow regulating device such as normally closed solenoid type fluid valve 31. A second fluid level control device 32 is positioned within storage tank 2 for detecting a desired level of the purified fluid therein. Storage tank 2 is provided with an exit fluid passage 33 for conveying the purified fluid through a pump 5 to an entrance fluid passage 34 of the distribution system pressure tank 6. For convenience, pump 5 may be mounted directly on top of distribution tank 6. Tank 6 is provided with an exit fluid passage 35 for conveying the purified fluid stored within tank 6, under pressure, to outlet 7 and thence to a distribution system for ultimate utilization of the fluid. Exit passage 35 is also connected to a junction of outlet fluid passage 7 and a fluid passage 36, which in turn, is connected to fluid passage 28 by means of a fourth fluid flow regulating device, normally open solenoid fluid valve 37. Passage 36 in conjunction with valve 37 provides a safety feature whereby with valve 37 in an open position, the fluid under pressure within passage 36 ensures that no fluid will leak by solenoid discharge valve 29 while it is in a closed or blocking position.

Figure 3:
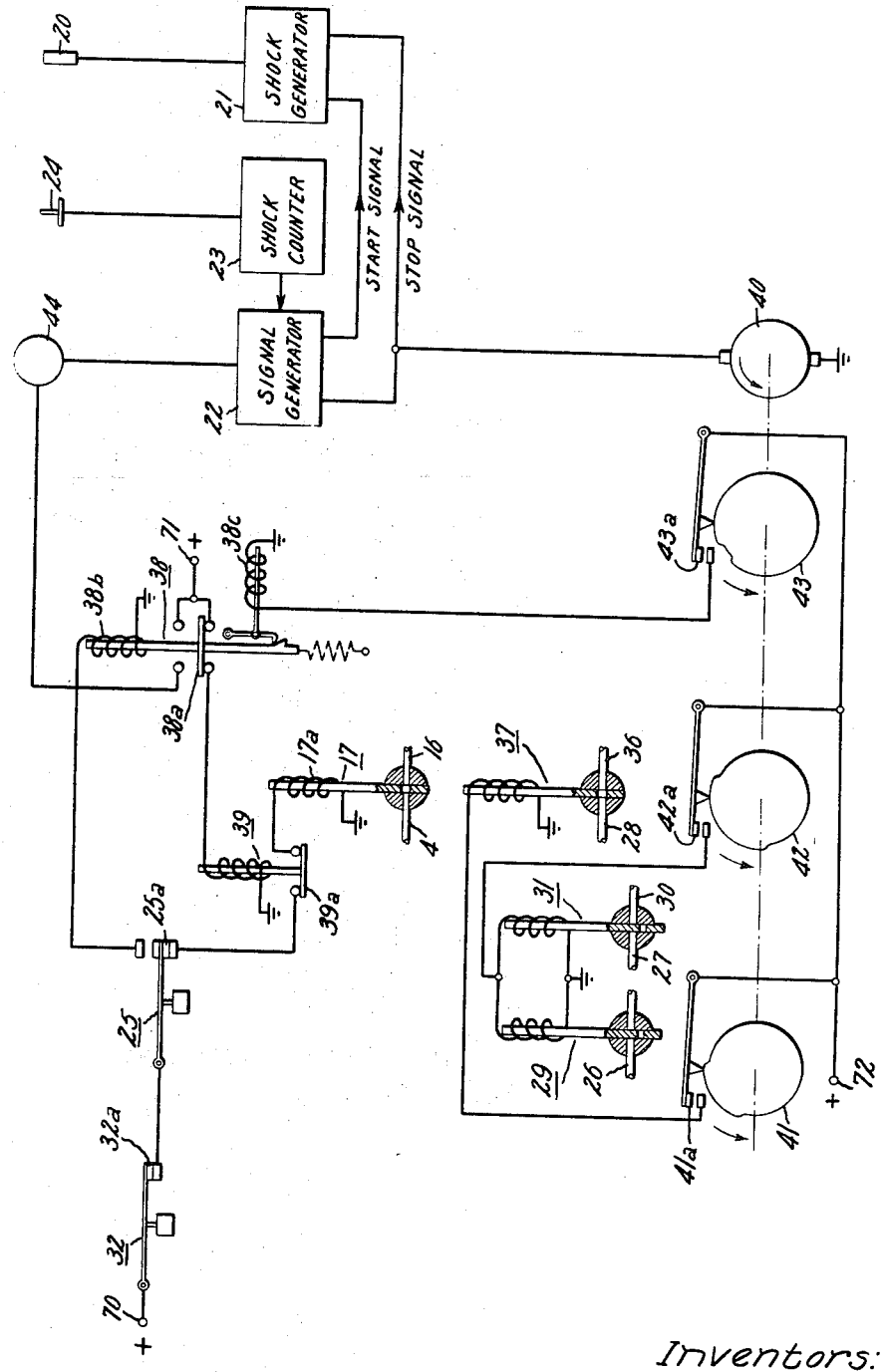
FIGURE 3 is a schematic diagram of an electromechanical control circuit employed with the apparatus illustrated in FIGURE 2.

The operation of our apparatus, as illustrated in FIGURES 1 and 2, will now be described in detail in conjunction with the schematic diagram of the electromechanical control circuit shown in FIGURE 3. The control circuit of FIGURE 3 determines the sequence of operation, that is, the opening and closing of the four solenoid fluid valves 17, 29, 31 and 37, and the interval during which the shock waves are generated within electrohydraulic chamber 3. It is assumed that initially, tanks 2 and 6 and chamber 3 are all empty and that the control circuit has just been electrically energized, supplying electric power to the indicated (+) terminals. Under these conditions, the movable contacts 32a, 25a, and 39a of purified fluid storage float level control 32, electrohydraulic chamber float level control 25, and fluid inlet relay 39, respectively, are each in the closed position as illustrated in FIGURE 3, thereby forming a complete electrical path from (+) power terminal 70 for energizing the solenoid 17a of valve 17. Solenoid valve 17 is thus initially in an open position permitting the flow of nonpurified fluid from storage tank 13 into electrohydraulic chamber 3. At this initial time, a relay 38 of the latch-unlatch type, hereafter designated electrohydraulic relay 38, is in an unlatched condition, the movable contact 38a thereof being in the closed, down position as viewed by the reader and such contact position completes an electrical path for energizing the coil of a fluid inlet relay 39, resulting in the contact 39a of relay 39 being in the indicated closed (up) position. During the initial period when electrohydraulic chamber 3 is being filled with the nonpurified fluid, a cam motor 40 is in an unenergized condition, since there is no closed circuit to its source of power (+) terminal 71, and the contacts 41a, 42a and 43a associated with the motor driven cams 41, 42 and 43, respectively, are each in their open position, as illustrated. During this initial time interval of supplying nonpurified fluid into electrohydraulic chamber 3, discharge valves 29 and 31 are in a closed position and pressurized safety valve 37 is open. Also during this initial interval, a time delay relay 44 is deenergized and as a consequence, shock generator 21, signal generator 22 and shock counter 23 are in their off condition.

At the termination of the above described initial interval of time, electrohydraulic chamber 3 has filled to the height of float level control 25 and contact 25a thereof then switches to a closed, up position as viewed by the reader, thereby deenergizing fluid inlet solenoid 17a and closing its associated mechanical valve. The switching of the contact of float level control 25 to the closed, up position also simultaneously energizes a latch coil 38b of electrohydraulic relay 38 and thereby switches the contact 38a thereof to the latched or closed, up position as viewed by the reader. The switching of contact 38a to the up position opens the electrical circuit of the coil of fluid inlet relay 39 thereby switching the contact 39a thereof to an open or down position as viewed by the reader. Electrohydraulic relay 38 having its contact 38a in the latched position thereby completes an electrical circuit between time delay relay 44 and a power supply (+) terminal 71 to energize such relay and initiate a time delay which ensures complete closure of fluid inlet valve 17 prior to the commencement of the next sequence of operation.

At the termination of the time delay, an electrical circuit is completed between (+) terminal 71 and the signal generator 22 thereby generating a start signal for initiating the operation of shock generator 21. Shock generator 21, upon initiation, commences to generate a predetermined number of relatively low energy electric pulses which are transmitted to discharge electrode 20 immersed within electrohydraulic chamber 3. Upon the termination of the predetermined number of pulses as counted by shock counter 23, a stop signal is generated by signal generator 22 and supplied to shock generator 21 for terminating its operation. Simultaneous with the turning off of shock generator 21, cam motor 40 is energized and thus rotates to begin its sequence of cam operations. The cam operation sequence begins by cam 41 rotating into a closed position (contacts 41a closing) thereby energizing the solenoid of safety valve 37 and thus closing its associated mechanical valve and preventing fluid flow from the pressurized purified water storage tank 6 to fluid passage 28. After a first interval of time, $\Delta T_1$, which by way of example only, may be in the order of one second or less, the cam motor 40 has rotated sufficiently for cam 42 to reach a closed position whereby the solenoids of discharge valves 29 and 31 are energized to thereby open their associated mechanical valves and permit the flow of fluid, which had been purified within electrohydraulic chamber 3, to flow into collecting and storage tank 2. The passage of the purified fluid from electrohydraulic chamber 3 into storage tank 2 with valve 17 being closed causes contact 25a of float level control 25 to switch into a closed, down position as viewed by the reader. Electrohydraulic relay 38, being of the latch-unlatch type, remains in its latched position since the unlatch coil 38c thereof has not as yet been energized. After a second time interval, $\Delta T_2$, which may be in the order of ten seconds or less, cam 42 has reached its open position and the solenoids of discharge valves 29 and 31 are deenergized thereby closing such mechanical valves. Cam motor 40 thence continues to rotate through a third interval of time, $\Delta T_3$, which may be in the order of one second or less, at the end of which cam 41 opens thereby deenergizing the coil of safety valve 37. Deenergization of this latter coil operates to open the mechanical valve 37 to permit pressurized, purified fluid within fluid passage 36 to pass through valve 37 and thereby provide a safety feature which ensures against any possible leakage of unpurified fluid by discharge valve 29 into passage 27 or any subsequent component of the apparatus. After cam 41 has opened, a fourth time interval, $\Delta T_4$, which may be in the order of one second or less, transpires, at the end of which cam 43 closes, such action energizing the unlatch coil 38c of electrohydraulic relay 38 thereby switching contact 38a thereof to the closed, down or unlatched position. The unlatching of relay 38 provides a complete electrical path from power (+) terminal 71 to the coil of fluid input relay 39 thereby switching contact 39a thereof to a closed, up position and completing an electrical connection between (+) terminal 70 and solenoid 17a of fluid input valve 17. Thus, at the end of time interval $\Delta T_4$, fluid input valve 17 has reopened, permitting additional unpurified fluid to flow from storage tank 13 to the interior of electrohydraulic chamber 3. The unlatching of relay 38 also removes power from cam motor 40, thus turning it off. At the start of the next cam motor sequence, a time interval $\Delta T_5$ transpires, which may be appreciably shorter than one second, removing power from the unlatching coil 38c of relay 38 thus resetting it for the remaining cam motor sequences. It may be noted that at this time the float level controls, relays and solenoid valves are all in the position illustrated in FIGURE 3. The sequence above recited is repeated until storage tank 2 and distribution system pressure tank 6 are filled to a level as determined by purified fluid storage float level control 32. At such time, float control 32 is actuated and contact 32a thereof opens to an up position thereby deenergizing solenoid 17a of fluid input valve 17 and closing the mechanical valve thereof. The apparatus is now in a state of readiness to supply purified fluid from outlet passage 7 to be utilized by the distribution system. Upon the utilization of the purified fluid, such as by the opening of a faucet connected therein, storage float level control 32 operates to switch contact 32a thereof to a closed, down position and thereby reenergize solenoid 17a of fluid input valve 17, thus opening the mechanical valve element thereof and permitting the passage of unpurified fluid into electrohydraulic chamber 3. The sequence then continues until storage tank 2 and distribution system pressure tank 6 are again filled.

The time intervals of cam operation above described are merely exemplary. A particular size apparatus useful in a normal one family household for purifying a rural water supply comprises a one gallon electrohydraulic chamber 3 and storage tanks 2 and 6 each having a capacity of 20 gallons. These fluid containers and associated electromechanical control equipment can be placed within a suitable cabinet as shown in FIGURE 1 having the approximate dimensions of a base member 36 inches wide and 36 inches long, the cabinet having a height of 40 inches. For the particular cam time intervals above designated, one complete sequence of the cam operation is accomplished in approximately 15 seconds and therefore, assuming that each cam has only a single raised member, motor 40 may conveniently be a 4 r.p.m. motor. It is apparent that a proper choice of a gear arrangement between motor 40 and the cams driven thereby permits motor 40 to be rotated at a higher or lower speed than that of 4 r.p.m. Further, it should be obvious that the cams can each have a plurality of raised members suitably distributed about the periphery thereof in place of the single member illustrated in FIGURE 3. Also, the capacities of the fluid containers are illustrated for exemplary purposes only and the sizes employed would be determined by the particular size of the distribution system utilizing such purified fluid. Finally, it must be understood that pump 5 and distribution system pressure tank 6 are employed to provide the purified fluid at a desired pressure level. Thus, in applications wherein such purified fluid may be utilized by merely draining from storage tank 2, the apparatus may be simplified by omitting pump 5 and tank 6. Safety means, other than the use of safety valve 37, may be employed to insure that no unpurified fluid leaks past discharge valves 29 and 31 into storage tank 2. Examples of such other safety means are the use of a pressurized gas instead of the pressurized purified fluid, or the insertion of a liquid pump between tanks 2 and 3, thus insuring a positive flow interruption when the pump is turned off.

Figure 4:
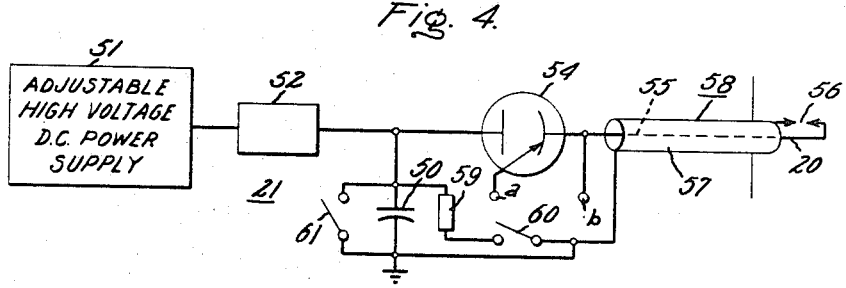
FIGURE 4 is an electrical schematic circuit diagram of the electrohydraulic shock generator depicted in FIGURES 2 and 3.

The electrical circuit which comprises a pulse generator, hereinafter recited as shock generator 21, is shown schematically in FIGURE 4. The electrical circuit is a relatively low energy electrical circuit comprising a charge and discharge circuit for capacitor 50. Capacitor 50, in general, comprises a single capacitor or a plurality of parallel connected power capacitors. Such capacitors have a high voltage, high capacitance, and low inductance rating. An electrical series circuit which comprises the charge path for capacitor 50 includes an adjustable high voltage direct current power supply 51 which may be of conventional design, a current limiting resistor 52 (or current limiting reactor), and capacitor 50 being suitably grounded. The average charging current is determined from the equation:

$$I = CV/t$$

where C is the capacitance, V the voltage, and $t$ the time. Since capacitor 50 has a relatively high capacitance and is charged to a relatively high voltage, it can be appreciated from the energy equation for a capacitor:

$$J = \tfrac{1}{2} CV^2$$

wherein J is the electric energy in joules or watt seconds, that electric energy of various magnitudes can be stored with capacitor 50. From the relationship $J = \tfrac{1}{2} CV^2$, it can be seen that energy varies as the square of the voltage, thus providing a convenient method for controlling the energy magnitude by varying the voltage.

After capacitor 50 is charged to a desired energy level, it is discharged at a desired time thereafter by initiating conduction through a three-electrode rectifier 54, which may be of the ignitron type, and is connected within the discharge path of capacitor 50. Conduction of rectifier 54 is effected by applying a suitable triggering pulse of electric energy of very small magnitude between a control electrode and cathode (terminals *a* and *b*, respectively) of rectifier 50. The complete discharge path for capacitor 50 comprises a series circuit including three-electrode rectifier 54, a low inductance electrical conductor network 55, a spark gap 56, and a return to the ground side of capacitor 50 from a shielded portion 57 of conductor network 55. Conductor network 55 is preferably a shielded coaxial power cable 58 of a flexible type and a plurality of parallel connected sections of cable (not shown) may be conveniently employed to match the impedance of the spark gap to the impedance of the capacitor 50-rectifier 54 portion of the discharge circuit. Cable 58 is of a construction preferably having a minimum inductance and low surge impedance. Additional capacitor discharge circuits comprising resistor 59, and switches 60 and 61 may be employed to remove any residual charge from capacitor bank 50. The equipment operates automatically upon energization, by appropriate electromechanical control means.

An end portion of cable 58 is connected to electrode 20 which electrode is positioned within chamber 3 so as to be immersed in the suitable relatively noncompressible fluid dielectric medium enclosed by the chamber. Spark gap 56 is formed between the spark discharge electrode 20 connected to an end of conductor portion 55 of cable 58 and the grounded shield 57 thereof. The electrodes are spaced apart as widely as possible and yet obtain a discharge therebetween with minimum loss of energy. Upon discharge of capacitor 50, the stored energy passes through rectifier 54 to the spark discharge electrode 20. The electrical conductors which interconnect the normally paralleled capacitors 50, (only one being shown) and the electrical conductors which connect the capacitor bank 50 to three-electrode rectifier 54 and the shielded portion 57 of cable 58 preferably comprise electrical bus work. The use of such bus work and the characteristics of cable 58 hereinabove described provide an electric circuit having minimum inductance commensurate with the maximum voltage employed in order to develop an electric energy discharge and thus provide a pulse of energy having a relatively steep wave front. The discharge of the stored electric energy within a relatively noncompressible fluid dielectric medium at the spark gap generates a steep pressure or shock wave within such medium. The resulting electrohydraulic energy conversion within the fluid medium purifies such fluid by killing or otherwise destroying many types of bacteria and microorganisms such as *E. coli, B. subtillis, B. globigii,* bacteriophage T-2, *Alcaligenes faccalis, Staphylococcus aureus, Mycobacterium phlei,* algae, *Pseudomonas acruginose, Streptococcus faccalis, Serralia marcescens, Saccharyomyces cerevisiac,* viruses, fungi, yeast, flagellates, eccglenids, *Diaromis asscocbas,* zooflagellates, ciliates, rotifers, existing in such fluid in unpurified form.

While the exact mechanism of electrohydraulic energy conversion and fluid purification is a complex phenomenon not fully understood at present, the following explanation of the operative principles involved is offered to explain such phenomenon. Delivery of high voltage electric energy to the spark gap is at a faster rate than the fluid medium's ability to absorb the heat generated thereby. Consequently, the fluid medium is vaporized in the gap vicinity undergoing at least partial ionization. Subsequent expansion of plasma bubble during the short time interval of energy release produces a shock wave in the remaining noncompressible fluid environment.

In the particular case wherein nonpurified water is the fluid medium, the destruction of the bacteria and other microorganisms, hereinafter called the contaminant, is attributed primarily to the chemically active species formed, the ultraviolet energy release, the high localized temperature, the intense pressure or shock wave generated within the water and phase changes caused by this intense pressure or shock wave. The chemically active species formed by the arc discharge appear to play an especially significant role in purifying the water. The active species formed may be described as the decomposition products of the liquid media, for instance in water, hydrogen and the hydroxyl radicals and also nascent hydrogen and oxygen, hydrogen peroxide and ozone. The phase changes occurring due to the shock wave are the change from the water liquid to a gas or vapor phase or even to a solid ice phase at such high pressures for an instant of time. The values of the energy controlling parameters, such as voltage, capacitance, resistance and inductance, and certain design parameters such as electrode gap, liquid volume, and liquid physical and chemical properties can be varied according to the particular application and end effect desired. Although the interrelation between parameters is complex, and at present not fully understood, there are apparent optimum conditions for each particular organism and liquid media which results in effective purification. The energy for purification can range from as low as a fraction of a kwh. to as high as several hundred kwh. per 1000 gallons of media to be purified.

FIGURE 2 of the drawings illustrated an electrohydraulic purification apparatus used for purifying a fluid medium on a batch basis, that is, utilizing electrohydraulic chamber 3 intermittently to maintain a desired level of purified fluid within storage tank 2. A much simplified apparatus employing the electrohydraulic purification principle is illustrated in FIGURE 5 wherein the purified fluid is obtained on a continuous rather than batch, basis. In FIGURE 5, an electrohydraulic chamber 3 is shown having an inlet fluid passage 16 and outlet fluid passage 26. The major distinction between the electrohydraulic chambers of FIGURES 2 and 5 is that the chamber of FIGURE 5 is provided with a plurality of spark discharge electrodes 20 and baffles 66. Baffles 66 guide the flow of unpurified fluid entering the chamber through inlet passage 16 and cause it to flow in a path including the vicinity of each of the discharge electrodes 20 thereby ensuring electrohydraulic action on all of the fluid entering the chamber. The example in FIGURE 5 illustrates three such zones. Electrodes 20 may be energized simultaneously, sequentially or in any manner as required by the particular application. Thus, fluid inlet 16 may be connected to a source of constant flowing nonpurified fluid and fluid outlet 26 will provide a constant flow of the purified fluid which can be utilized by a distribution system (not shown) connected to outlet passage 26.

In FIGURE 6 is shown an electrohydraulic apparatus especially adapted for processing fluid and semifluid food products and other purified products such as drugs which are constituted from at least two materials, one of which being a relatively noncompressible dielectric fluid. A food processing electrohydraulic apparatus comprises an electrohydraulic chamber 3 which is preferably of a sufficiently large size to produce large batches of the desired food product. Alternatively, chamber 3 may be of smaller size and its outlet connected to a storage tank whereby the electrohydraulic chamber is operated intermittently in the manner described with relation to FIGURE 2. The use of a large electrohydraulic chamber 3 necessitates the use of either a single large discharge electrode 20 or a plurality of smaller electrodes arranged within chamber 3. A nonpurified fluid, which in purified form comprises one of the constituents of the desired end food product, enters chamber 3 through inlet passage 16. The source of such nonpurified fluid may be connected to passage 16 by means of an appropriate fluid valve 17. The remaining constituent elements of the desired food product are supplied to electrohydraulic chamber 3 by means of a suitable hopper 62. A conveyor belt (not shown) or other suitable means is arranged to deposit such other constituent elements within hopper 62. Baffles 63 and 66 prevent fluid within chamber 3 from splashing out through hopper 62 and entering passage 26, respectively, during shock wave generation. A screen or grating 64 of sufficient porosity to permit passage of the desired food product therethrough while straining out any undesired portions of the constituent elements may be employed intermediate electrode 20 and outlet passage 26. Outlet fluid passage 26 is provided at or near the bottom of chamber 3 for dispensing the desired purified product and may be provided with a suitable fluid valve 29, if desired. Examples of the use of the apparatus illustrated in FIGURE 6 is in the production of an orange drink wherein nonpurified water enters chamber 3 by means of passage 16 and oranges, either peeled or unpeeled, and other necessary ingredients are supplied to chamber 3 by means of hopper 62. A predetermined amount of the fluid and oranges and other material are supplied to chamber 3 and discharge electrode 20 is thence fired in a predetermined sequence to both purify the fluid provided from passage 16 and simultaneously break down the fleshy part of the oranges into minute particles. The orange pits and any other undesired portions of the orange are trapped by screen 64 thereby permitting passage therethrough of only the desired orange drink to exit passage 26. It can be appreciated that the apparatus illustrated in FIGURE 6 may be employed to produce many other food products which may or may not be in a final liquid state. Thus, by way of example and not of limitation, various types of baby food, preserves and soups may be prepared by my apparatus.

FIGURE 7 illustrates a fourth embodiment of an apparatus constructed in accordance with our invention and is especially adapted for sterilizing the solid surfaces of products, such as surgical instruments for example. In this embodiment, a fluid container 70, containing a dielectric liquid such as water, is provided with a hinged cover member 71. A wire basket, 72, containing the instruments 73 to be sterilized is inserted within container 70 such that the instruments 73 are immersed within the water. Energization of immersed discharge electrode 20 contained within container 70 by operation of shock generator 21 performs the sterilization in a manner heretofore described.

From the foregoing description, it can be appreciated that our invention makes available a new electrohydraulic apparatus for purifying a fluid medium and further, may be employed in the preparation and processing of fluid material which exists in a liquid or semiliquid state and for sterilizing the surfaces of solids placed in a fluid medium. Our apparatus is more efficient than other known electrohydraulic purification apparatus in that a lower energy level (kwh. per 1000 gallons of fluid) is required to kill an equal number of bacteria and other microorganisms with our apparatus. The apparatus converts controlled pulses of relatively low electric energy into mechanical energy within a liquid dielectric medium whereby a predetermined sudden pressure or shock wave is generated therein. Adjustment of the electric circuit parameters permits the rate of energy transfer within the fluid medium to be accurately controlled to conform to the needs of the particular process application.

Having described two embodiments of our apparatus for use in batch processing, one embodiment for continuous processing of a fluid medium and one embodiment for batch processing of solid surfaces, it is believed obvious that modification and variation of our invention are possible in the light of the above teachings. Thus, various types of devices for discharging electric current in pulse form, including semiconductor devices may be used in place of ignitrons, other types of fluid flow control devices may be employed in place of the solenoid valve disclosed, and the sequential operation of the various relays, float level controls and fluid valves may be altered to suit the particular application. Also, sequential operation of the various components may be produced by other well known means in place of the cam motor and cams. Finally, a further embodiment of our invention employs the suspension of one or a multiple number of discharge electrodes in a suitable electrode holder immersed in a natural body of water such as a pond, lake, stream or river or in a well or reservoir in order to purify the water to destroy specific organisms such as seaweed or algae. In addition, suspension of a group of such electrodes adjacent to an underwater structure such as a pier, ship hull, sea wall, and other underwater structures will destroy such organisms as barnacles, wood boring worms, algae, crustaceans and other forms of sea life which are detrimental to these underwater structures as a direct result of the sudden electrohydraulic pressure waves generated in the immediate vicinity thereof. It is, therefore, to be understood that changes may be made in the particular embodiments as described which are within the full intended scope of the invention as defined by the following claims.

What we claim as new and desire to secure by Letters Patent of the United States is:

1. An electrohydraulic purification apparatus comprising
   a treatment chamber for receiving a predetermined amount of a contaminated fluid comprising a relatively non-compressible dielectric liquid;
   electrohydraulic shock generating means for generating arc discharges within said chamber, said electrohydraulic means comprising electric energy capacitative charging and discharging circuits, said discharging circuit including at least one discharge electrode positioned within said chamber so as to be immersed by said predetermined amount of fluid;
   means for sensing and counting said arc discharges within said chamber; and
   an electrically controlled valve and conduit means responsive to said sensing and counting means for admitting a predetermined amount of said contaminated fluid to said chamber, retaining said fluid in said chamber for a time sufficient to expose it to a predetermined number of purifying electrohydraulic shock discharges, after which said purified amount of fluid is withdrawn from said chamber.

2. The apparatus set forth in claim 1 which includes a pressure receptacle for receiving the purified fluid from said chamber including pumping means for delivering said fluid from said receptacle to an outlet conduit under a positive pressure.

3. The apparatus set forth in claim 2 which includes an intermediate storage receptacle connected to said treatment chamber by valve and conduit means to receive the purified fluid therefrom and by conduit means to said pressure receptacle for delivering said fluid from said storage receptacle to said pressure receptacle.

4. The apparatus set forth in claim 3 which includes two valves spaced apart in said conduit connecting said chamber and said storage receptacle, a valved conduit interconnecting the conduit in the space between said two spaced apart valves and said pressurized fluid from said pressure receptacle, and means for admitting the purified fluid from said pressure receptacle under positive pressure to said space in said conduit when both said spaced apart valves are closed.

References Cited

UNITED STATES PATENTS

| | | | |
|---|---|---|---|
| 672,231 | 4/1901 | La Comme | 204—327 X |
| 696,647 | 4/1902 | La Comme | 204—305 |
| 1,863,222 | 6/1932 | Hoermann | 99—217 |
| 2,931,947 | 4/1960 | Fruengel | 315—111 |
| 3,034,520 | 5/1962 | Jewell | 134—99 |
| 3,288,697 | 11/1966 | Whitson et al. | 204—193 |

JOHN H. MACK, *Primary Examiner.*

A. C. PRESCOTT, *Assistant Examiner.*